United States Patent [19]

Berry et al.

[11] Patent Number: 4,695,387

[45] Date of Patent: Sep. 22, 1987

[54] REMOVAL OF AMMONIA FROM WASTEWATER

[75] Inventors: W. Wes Berry; William R. Erickson, both of Lakeland, Fla.

[73] Assignee: Advanced Separation Technologies Incorporated, St. Petersburg, Fla.

[21] Appl. No.: 731,281

[22] Filed: May 7, 1985

[51] Int. Cl.[4] ............................................. C02F 1/42
[52] U.S. Cl. ................................... 210/676; 210/681
[58] Field of Search ............... 210/657, 670, 676, 681, 210/267, 284, 669

[56] References Cited

U.S. PATENT DOCUMENTS

| | | | |
|---|---|---|---|
| 2,617,986 | 11/1952 | Miller | 210/282 |
| 3,475,330 | 10/1969 | Gilles | 210/681 |
| 3,723,308 | 3/1973 | Breck | 210/681 |
| 3,929,600 | 12/1975 | Hiasa et al. | 210/681 |
| 3,948,769 | 4/1976 | Dobbs | 210/681 |
| 3,971,842 | 7/1976 | Ewbank | 210/267 |
| 4,344,851 | 8/1982 | Sherman et al. | 210/681 |
| 4,522,726 | 6/1985 | Berry et al. | 210/267 |
| 4,522,727 | 6/1985 | Weber | 210/681 |

*Primary Examiner*—Ivars Cintins

*Attorney, Agent, or Firm*—Burns, Doane, Swecker & Mathis

[57] ABSTRACT

A process is disclosed for the continuous removal of ammonia from wastewater which converts the otherwise undesirable ammonia to a commercially useful end product such as ammonium phosphate. The process is carried out in an Advanced Separation Device which comprises a plurality of chambers moving about a circular path in periodic fluid communication with a plurality of fixed feed and discharge ports. The chambers are filled with a zeolite adsorbent which effectively adsorbs the ammonium ions contained in the wastewater at low pH levels but which, when contacted with an alkaline regeneration solution, releases the previously adsorbed ammonium in the form of ammonia gas, for which the zeolite has no affinity. By virtue of the ASD design, it is possible to add acidic materials to the wastewater in an intra-stage fashion i.e. during the adsorption step so as to optimize process efficiency. Similarly, intra-stage addition of alkaline materials during the regeneration step results in increased process efficiency. The process may be practiced with both industrial and municipal wastewaters.

13 Claims, 5 Drawing Figures

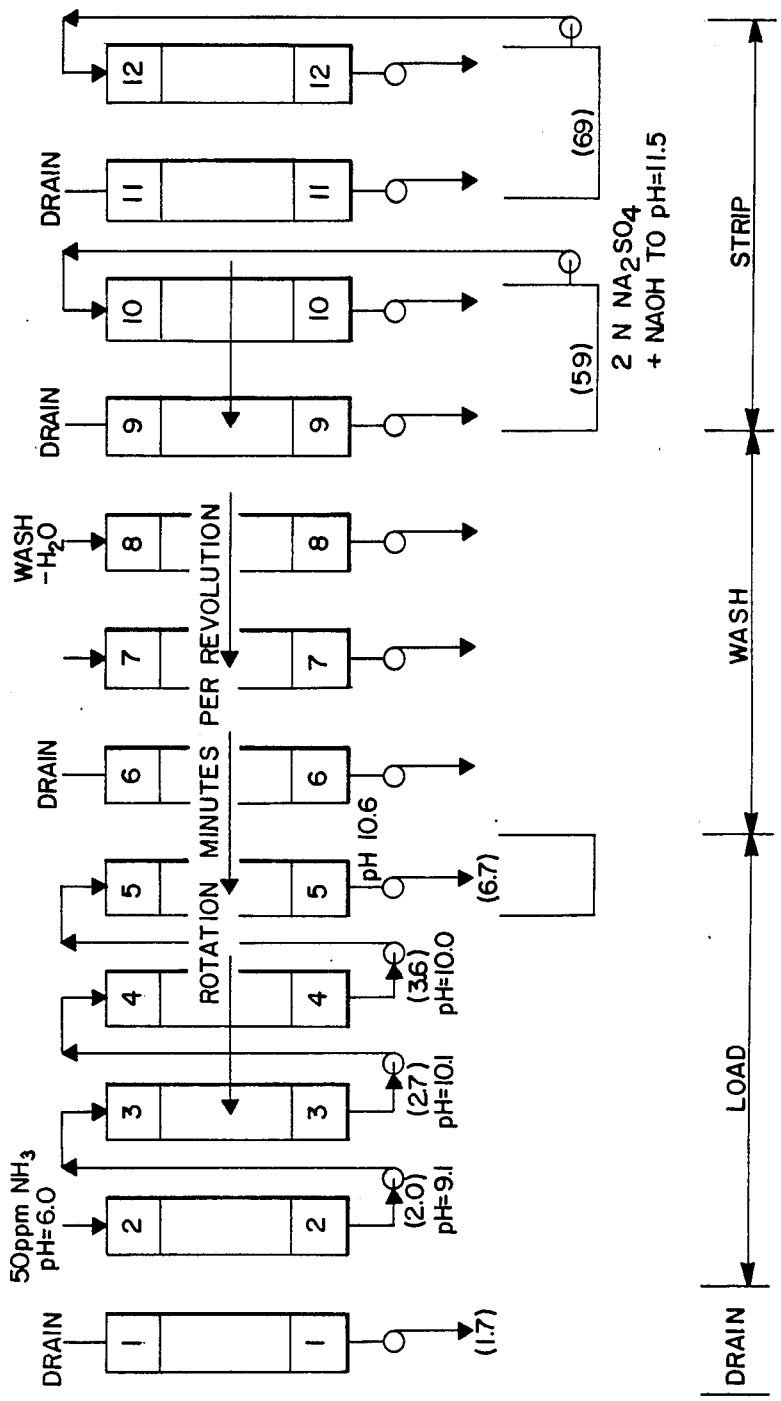

REMOVAL OF AMMONIA FROM WASTEWATER

BACKGROUND OF THE INVENTION

The present invention relates to a process for the removal of ammonia from wastewater and more particularly, to a process wherein ammonium ions are adsorbed onto zeolite and subsequently recovered as ammonia gas.

The presence of ammonia in wastewater is undesirable since the nitrogen contained therein acts as a fertilizer for aquatic plant life thereby resulting in the phenomenon commonly known as "algae bloom". Heretofore, methods have been proposed for removing ammonia from wastewater. One such method involves liming of a body of water which converts the ammonium ions to gaseous ammonia which is then liberated, via air stripping into the atmosphere. Rather than eliminate the adverse environmental effects of ammonia however, liming merely transfers the problem from the water to the atmosphere. Additionally, since useful products may be produced from ammonia as a starting reagent, the liberation of ammonia into the atmosphere represents a significant economic loss.

In U.S. Pat. No. 4,011,156, a method of eliminating organic and inorganic bound nitrogen from domestic and industrial wastewater is disclosed. The process is generally carried out by passing the wastewater, an alkaline substance, and oxygen through a fixed bed reactor containing a catalyst whereby the ammonia is converted to harmless nitrogen gas. The alkaline substance is added since a marked decrease in pH occurs as the $NH_4^+$ is oxidized to $N_2$ and since such a pH decrease was observed to adversely affect efficiency of the reaction as well as the catalyst.

While the conversion of wastewater ammonia to nitrogen gas is highly desirable from an environmental viewpoint, it is not very economical since a potentially valuable material is being converted into a useless form and expelled into the atmosphere. Additionally, the process itself is cumbersome, requiring a practitioner to evaluate the pH values of the reaction mixture along different points of the fixed bed.

In U.S. Pat. No. 3,984,313, sewage water containing ammonia as well as phosphates is purified by using a ferric hydroxide loaded ion exchange resin. While the proposed process is desirable economically since ammonium hydroxide, which is a commercially useful end product, is produced from the ammonia contaminant, the process itself suffers from the disadvantage that it is not continuous since the wastewater feed must be temporarily shut down and the spent resin replaced with fresh resin.

It has been observed that zeolites have a high affinity for ammonium ions and would therefore be quite effective as adsorbents for removing the ions from wastewater solutions. Since zeolites have no affinity for ammonia gas, the ammonium ions initially adsorbed onto the zeolite could be desorbed merely by increasing the pH enough to convert the bound ammonium ions to unbound gaseous ammonia. Such a process would prove highly desirable from both an economic and environmental viewpoint since the bulk of the ammonium ions would be removed from the wastewater and since the ammonia subsequently released is not only a commercially valuable material as is, but also may be converted relatively easily to a host of other commercially valuable materials such as ammonium phosphate.

Despite their high affinity for ammonium ions as well as the environmental and economic advantages discussed above, zeolites have not proven completely effective when used in conjunction with conventional purification techniques such as fixed or pulsed beds. One reason for this lack of effectiveness is the low loading capacity of zeolites, i.e., the amount of ammonium ion which can be adsorbed per unit of zeolite. Thus, in order to effectively use zeolites as adsorbents in conjunction with ammonia removal processes, an inordinate amount of zeolite would be required thus resulting in increased costs in terms of materials, equipment, energy expenditures, and down-time. Such drawbacks would be in addition to those already described with respect to prior art fixed bed processes utilizing other adsorbents or ion exchange resins. Such drawbacks include difficulties in carrying out the reaction continuously as well as difficulties in maintaining the optimum pH as material is reacted or adsorbed.

SUMMARY AND OBJECTS OF THE INVENTION

In view of the foregoing limitations and shortcomings of prior art processes, as well as other disadvantages not specifically mentioned above, it should be apparent that there exists a need in the art for a process for removing ammonia from wastewater which may be carried out at optimum efficiency and which not only removes ammonium ions from wastewater but also enables the removed ammonia to be subsequently used as a commercial end product. It is, therefore, a primary objective of this invention to fulfill that need by providing a process wherein ammonium contained in wastewater is continuously and efficiently removed therefrom and subsequently recovered using zeolite adsorbent in conjunction with an advanced separation device.

More particularly, it is an object of this invention to provide a process for the removal of ammonia from wastewater which achieves optimum utilization of the zeolite adsorbent.

It is a further object of this invention to provide a process for the removal of ammonia from wastewater which produces no harmful by-products.

Yet another object of this invention is to provide a process for the removal of ammonia from wastewater wherein wastewater treated in a first zeolite stage and having reduced levels of ammonium therein may be circulated countercurrently and combined with fresh wastewater being fed to a second zeolite stage so as to maximize the process efficiency.

Still another object of this invention is to provide a process for the removal of ammonia from wastewater wherein the pH of the fluid to be treated may be controlled in an intra-stage fashion such as during the adsorption stage.

Another object of this invention is to provide a process for the removal of ammonia from wastewater which is compatible with existing wastewater treatment technology.

Briefly described, these and other objects of the invention are accomplished by providing a plurality of zeolite-filled chambers moving about a circular path under four stationary fluid feed ports, the first port supply wastewater containing ammonium ions, the second optional port supplying washwater which removes any entrained wastewater after the zeolite is exhausted, the third port supplying an alkaline regeneration fluid which converts the adsorbed ammonium into desorbed ammonia and the fourth optional port which supplies washwater which cleans the zeolite for repetition of the cycle. All four ports operate continuously to supply feed materials to the particular chamber in fluid communication with each port at any given moment. Four stationary discharge ports corresponding to the stationary feed ports are also provided. It should be noted that, depending on the nature of the wastewater stream being treated one, or possibly both, of the washwater streams could be eliminated.

BRIEF DESCRIPTION OF THE DRAWINGS

A preferred embodiment of the invention is illustrated and described with reference to the accompanying drawings, in which:

FIGS. 4 and 5 are flow sheets illustrating specific ammonia removing processes using the Advanced Separation Device.

DETAILED DESCRIPTION OF PREFERRED EMBODIMENTS

The process of the present invention is carried out in the Advanced Separation Device (ASD) which enables continuous contacting of a fluid stream and sorbent which, when incorporated with the overall process, allows for efficient removal of ammonia from wastewater. The ASD is described in detail in assignee's copending application Ser. No. 713,493 filed Mar. 19, 1985, the disclosure of which is hereby incorporated by reference.

Figure 1:
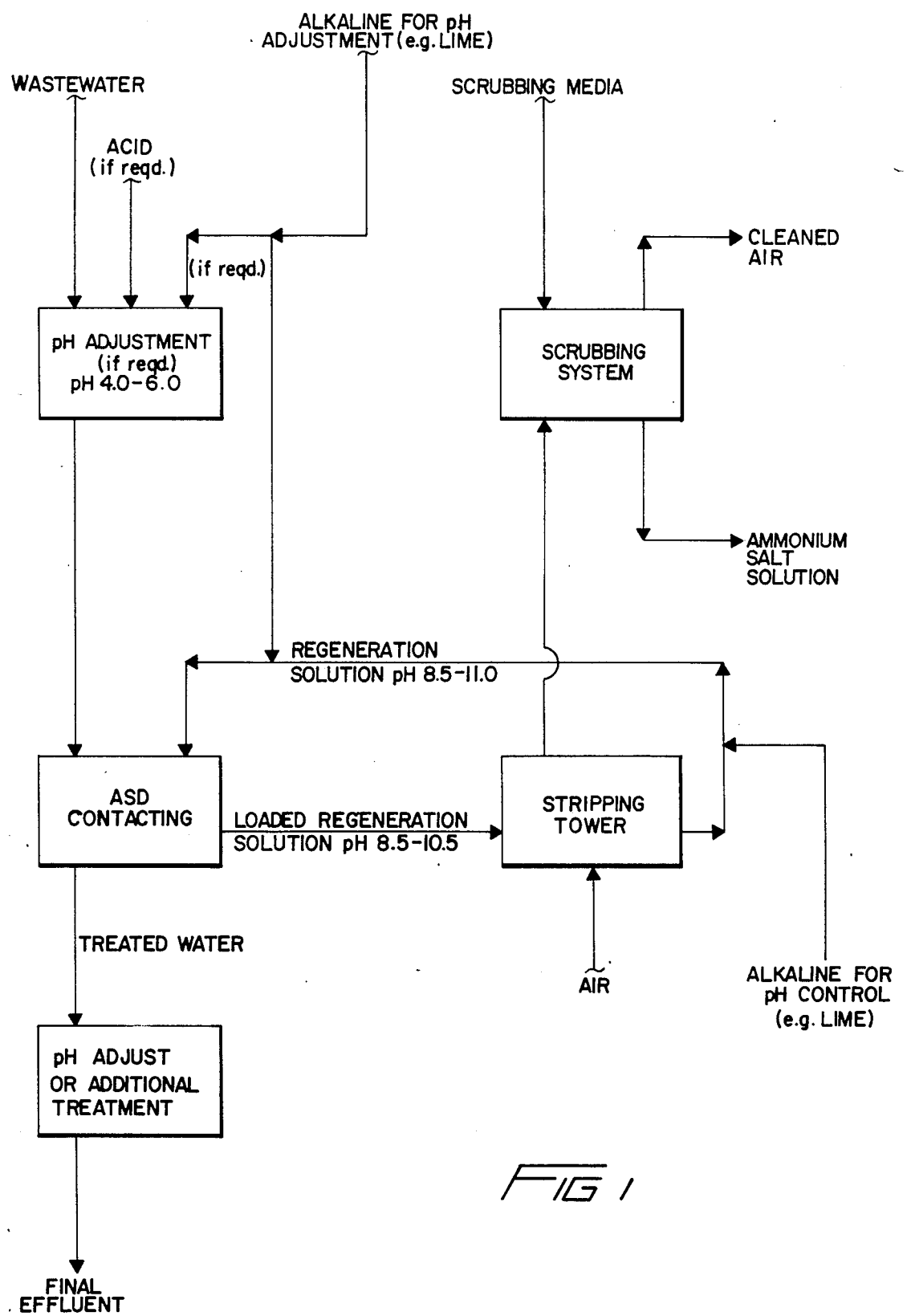
FIG. 1 is a flow diagram illustrating the general ammonia removal concept.
Figure 2:
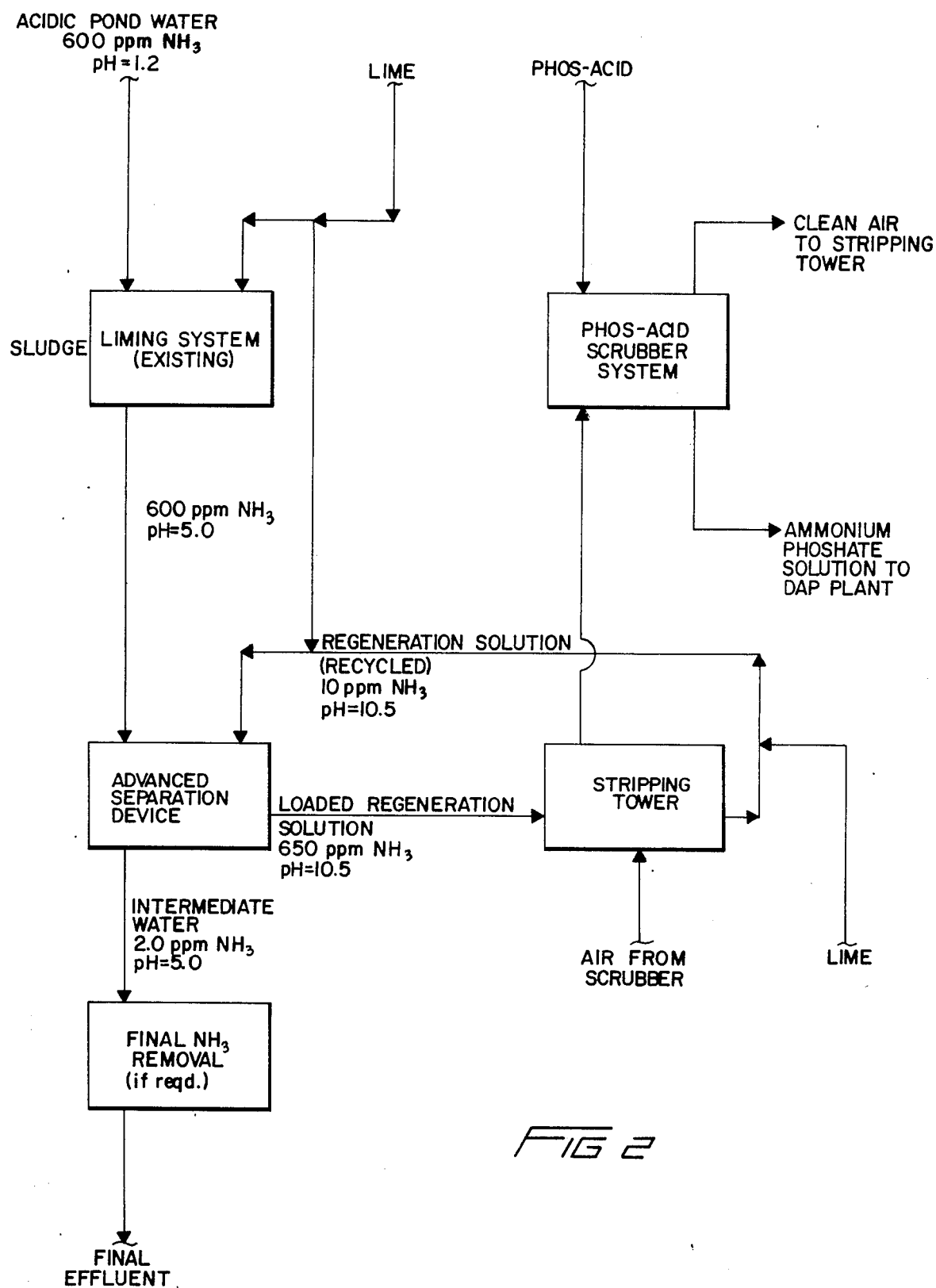
FIG. 2 is a flow diagram illustrating the ammonia removal concept as applied to phosphoric chemical complex wastewater.

Before describing the applicaton of the ASD device to this process, the overall process concept for the removal of ammonia from wastewater by zeolites utilizing the ASD is set forth in block diagrams, FIGS. 1 and 2.

Since the ammonia-containing wastewater treated according to the present invention may vary considerably in pH, it is first treated with an alkaline salt e.g., lime or an acid to adjust the pH to between about 4 and 6 since this is an ideal range of operation for the zeolite adsorbent.

The treated wastewater is then directed to the ASD where ammonium ions are adsorbed onto the zeolite. The adsorbed zeolite is then treated with an alkaline regeneration solution fed into the ASD which converts the adsorbed ammonium ions to unadsorbed ammonia which is then carried out of the ASD along with the alkaline material (loaded regeneration solution). That solution is then treated in a stripping tower with air which acts to displace the ammonia gas from the alkaline material. The alkaline material may then be fortified with lime or other alkaline or alkali salt and circulated back to the ASD. The ammonia may be reacted with any suitable scrubbing media, e.g., phosphoric acid, to yield ammonium phosphate, which is a commercially useful end product. The ammonium depleted wastewater can be subjected, if necessary, to a final ammonium removal, pH adjustment or additional treatment process before it is discharged.

Figure 3:
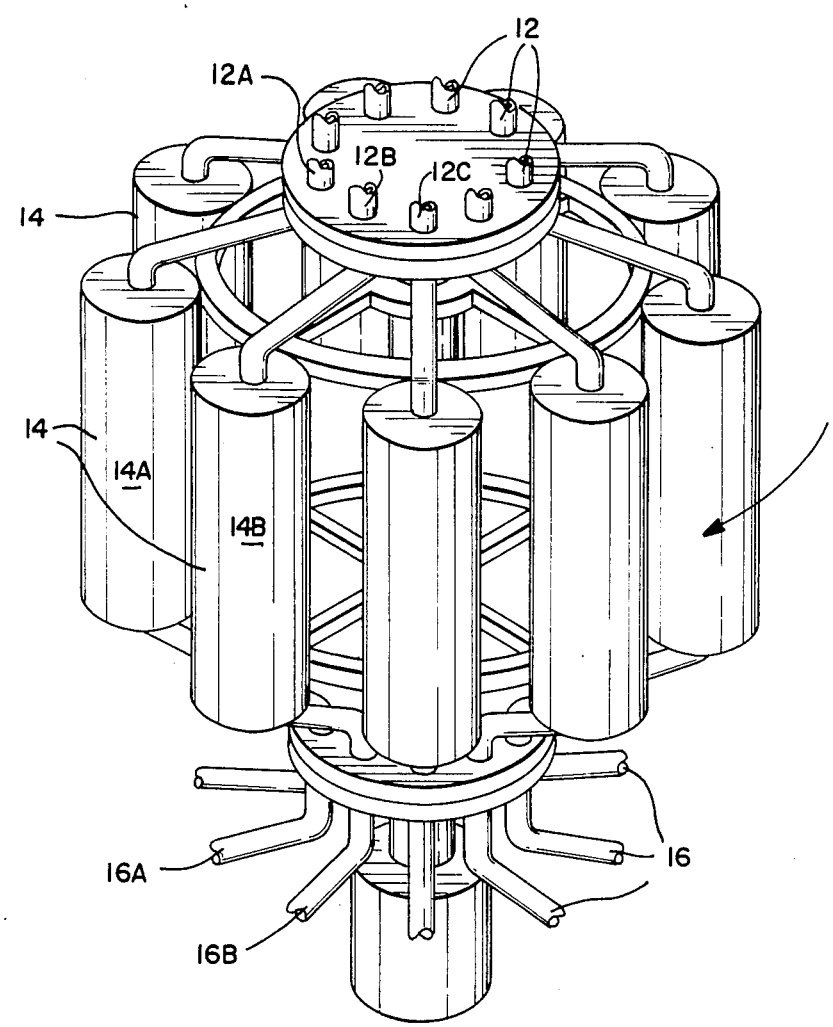
FIG. 3 is a perspective view of an exemplary Advanced Separation Device.

For convenience, a brief description of the ASD, illustrated in FIG. 3, will now be provided.

The ASD comprises a plurality of fixed feed ports 12, to each of which may be supplied various feed materials. In the case of the present invention, these materials include the ammonium containing wastewater, the alkaline regeneration fluid, and the washwater feeds.

Moving about a circular path in periodic fluid communication with each of the above-described stationary feed ports are a plurality of chambers 14 filled with an exchange material such as an adsorbent which interacts with the feed fluids. The effluent i.e., the fluid which results from the interaction of the feed materials with the exchange material will hereinafter be referred to as the interaction product. In the process of the present invention, the adsorbent is zeolite.

It will be appreciated that the feed materials are supplied continuously to their respective feed ports 12 for periodic interaction with the adsorbent in each of the chambers 14. In similar fashion, a plurality of stationary discharge ports 16 are provided at an end of the chambers opposite to that of the fixed feed ports 12. Each feed port 12 has a corresponding discharge port 16. After the interaction product passes through a given fixed discharge port, it may be purged from the system, recirculated back to a selected feed port, or a combination of both.

The pond waters or wastewaters under consideration typically originate from the processing steps involved in producing ammonium salt compounds, for example diammonium phosphate. In this process phosphoric acid is reacted with ammonia to produce a partially ammoniated slurry. This slurry is then pumped to a standard granulation system where it is sprayed onto a bed of recycled diammonium phosphate particles. Additional ammonia is sparged into the bed of material in order to achieve the proper ammonia/phosphate ratio. The material is then dried, sized, and sent to product storage. Some loss of material, i.e., ammonia, phosphate, etc., can be expected to occur. To avoid atmospheric discharge of such material, scrubbers are utilized. The scrubbing media is typically recirculated pond water. After a period of time, the concentration of ammonium and other contaminating ions builds up to an apparent steady-state concentration. Due to water balance considerations, it is sometimes necessary to discharge a portion of this pond water which may then be treated for removal of the objectionable ions such as fluorides, phosphorous compounds and the like. This is usually accomplished in a liming system. The present invention may be used to recover ammonia in conjunction with existing treatment systems.

The typical composition of the wastewater feeding existing treatment systems and the ionic content at each stage of liming is as follows:

| ANALYSIS (ppm) | TYPICAL PHOSPHATE COMPLEX POND WATER ANALYSIS | | |
|---|---|---|---|
| | POND WATER | 1ST STAGE LIME EFFLUENT | 2ND STAGE LIME EFFLUENT |
| pH | 2.1 | 5.4 | 9.9 |
| $NH_4+$ | 733 | 428 | 294 |
| P | 4070 | 1035 | 43 |
| Al | 67 | 0.2 | 0.6 |
| Fe | 52 | 0.6 | 0.8 |
| Ca | 1060 | 340 | 140 |
| Na | 1650 | 850 | 423 |
| K | 162 | 96 | 90 |
| Mg | 198 | 120 | 8 |

| | TYPICAL PHOSPHATE COMPLEX POND WATER ANALYSIS -continued | | |
|---|---|---|---|
| ANALYSIS (ppm) | POND WATER | 1ST STAGE LIME EFFLUENT | 2ND STAGE LIME EFFLUENT |
| SO4 | 4500 | 2700 | 2200 |
| F | 4320 | 71 | 11 |

It will be appreciated that although the concentrations of a number of contaminants are substantially reduced, ammonia levels nonetheless remain relatively high.

Normally, the pond water in a phosphate complex has a pH of 1.5 to 2.2 which is too acidic to be contacted with zeolite material. In the typical liming system, the acidic pond water is first contacted with lime to increase the pH to between 5 and 6 in order to reduce the soluble fluoride content. This addition of lime causes a precipitation of various salts, especially fluorides which leave the system as precipitates in a settling basin or clarifyer. In normal practice, this water would be transferred to the second stage of liming. If ammonia recovery is desired however, this first stage liming effluent would serve as the feed to the ASD system.

Thus, the first stage liming effluent is sent to the ASD and contacted with a solid adsorbent which consists of naturally occurring zeolites, specifically that zeolite known as clinoptilolite. It has been found that in other applications these particular zeolites have an affinity for ammonium ion over those typically "preferred" ion exchange resins, e.g. calcium, magnesium, etc. The process concept is shown in FIG. 2.

A zeolite found particularly advantageous for carrying out the process according to the present invention is that known as PDZ-150 marketed by the PDZ Corporaton. The properties of that zeolite are as follows:

| | |
|---|---|
| Solid density | 100 lbs/ft$^3$ |
| Bulk density | 45–80 lb/ft$^3$ |
| Hardness (mohs scale) | 5.1 |
| Pore size | 4.0 Å |
| Pore volume | 15% |
| Specific surface area | 1357 yd$^2$/oz. |
| Alkali stability pH | 7–10 |
| Acid stability pH | 3–7 |
| Thermal stability | 1202° F. |
| Cation exchange capacity | 1.55 m.e./g. |

The above zeolite comprises the following components:

| | |
|---|---|
| $SiO_2$ | 69.54% |
| $Al_2O_3$ | 9.86% |
| CaO | .88% |
| MgO | .17% |
| $TiO_2$ | .32% |
| $Na_2O$ | 1.16% |
| $K_2O$ | 4.65% |
| $Fe_2O_3$ | 1.92% |
| MnO | .034% |

The ammonium-containing wastewater is supplied to one or more of the fixed feed ports 12 shown in FIG. 3. In order to maximize process efficiency, the zeolite/wastewater interaction product being discharged from the fixed discharge port may be supplied to the next fixed feed port i.e., countercurrently circulated. Referring to FIG. 3, for example, if fresh wastewater is supplied to feed port 12A to yield an interaction product which is discharged through discharge port 16A, that product may then be circulated countercurrently i.e., to fixed feed port 12B, where the wastewater interaction product, containing reduced levels of $NH_4+$, will be fed into chamber 14B. If desired, this can be repeated so that the interaction product discharged from 16B, containing wastewater with further reduced levels of $NH_4+$, can be circulated to fixed feed port 12C.

Since the removal of the ammonia from the wastewater by the zeolite will cause the pH level to rise to a point where the zeolite efficiency is significantly reduced, an intra-stage addition of sulfuric acid may be used to maintain the pH at 5.0–5.5. This capability of adjusting the pH of the solution during the loading stage allows the maintenence of high, efficient loading of ammonium onto the zeolite material in the ASD. Thus, as the wastewater/zeolite interaction product is discharged from discharge port 16A, acid may be added prior to the addition of the interaction product to fixed feed port 12B.

The treated water, now containing significantly less ammonium ion, is then sent to a final ammonia removal process if required. This process could consist of the addition of ground zeolite material for final (ppm) removal of any residual ammonium or the water could be treated in a conventionally as by "break-point chlorination". In break-point chlorination, gaseous chlorine is added to the waste stream which results in the eventual oxidation of the ammonia to compounds which deteriorate to a nitrogen gas and are thus liberated from the waste product stream. The amount of chlorine required for this type of operation is about 10 parts chlorine for each part of ammonia removed. In the dusting operation a very fine powdered zeolite material is mixed with the effluent from the zeolite system which adsorbs the ammonia and is simply discarded. The partially treated water from the ASD sysem would then be sent to the second stage of liming wherein additional contaminants, especially phosphorous, are removed.

After the zeolite adsorbent is loaded with ammonia it moves into the washing stage. As with the adsorption stage, the washing stage is carried out by supplying a washing fluid to one or more fixed feed ports of the ASD whereby zeolites containing residual amounts of entrained material as well as untreated water are cleaned. The adsorbent then moves into the regeneration stage of the ASD where it is contacted with a solution consisting of an alkaline salt such as calcium hydroxide, sodium hydroxide, etc., which may contain a small amount of an alkali salt to serve as an electrolyte, e.g., sodium sulfate. In the conventional practice of ammonia adsorption in fixed-beds, use is made of an alkaline salt solution containing sodium chloride. However, for phosphoric acid applications, chloride ions must be kept segregated from the existing pond system, and it would be advantageous to eliminate the need for sodium chloride altogether in the event of spills, etc. It has been found that sodium sulfate will function as a suitable additive in an alkaline solution of, for instance, sodium hydroxide. It has also been discovered that a solution of clarified "lime-water" i.e. a solution of water saturated with calcium hydroxide, will function as a suitable regenerate. This approach is particularly advantageous in a phosphoric acid pond situation since the water leaving the ammonia recovery circuit is typically sent to a second stage liming system. Use of "lime-water" therefore, optimizes reagent consumption since lime used in the ammonia regeneration process is not used in the second stage of liming i.e. minimized costs.

This regeneration media is supplied to one or more of the fixed feed ports of the ASD for distribution into the rotating chambers containing the zeolite-$NH_4+$ adsorption complex. The regeneration media passing through the zeolite strips the ammonium from the zeolite by ion exchange and conversion of ammonium to ammonia for which the zeolite has no affinity. As with the adsorption stage, a counter-current technique using intra-stage pH control is employed to minimize reagent usage and optimize zeolite utilization during the regeneration stage. More specifically, as ammonia is removed from the zeolite by regeneration solution, the pH of the regenerate tends to decrease to a point where its capacity for removing ammonia from the zeolite is significantly reduced. The ASD lends itself to the addition of a caustic material at various points during the regeneration process, so as to maintain the pH at an optimum level.

The loaded regeneration solution i.e., the alkaline/$NH_3$ interaction product is then transferred to a stripping tower where it is contacted with a stream of air, or recycled gas. In one embodiment, a recycled gas stream is utilized in order to minimize the build-up of carbonate in the regeneration solution. The stripping gas removes the ammonia from the regeneration solution and results in ammonia-rich gas phase and an ammonia-depleted regeneration solution containing less than 50 ppm ammonia. The regeneration solution is then fortified with additional alkaline material, as required, and recycled to the ASD unit. Losses of the regeneration solution are therefore minimal.

The ammonia-rich stripping gas can then be transferred to an acid scrubbing system which consists of venturi scrubbers, spray towers and the like. In the case of a DAP operation, phosphoric acid is utilized as the scrubbing media to react with the ammonia in the stripping gas and produce an acidic, ammonium phosphate solution. This material is then returned to the existing diammonium phosphate operation. Hence the ammonia, which was at one point considered an objectionable waste material, is now converted to a usable ammonium phosphate compound resulting in improved, overall plant ammonia utilization efficiency. The ammonia depleted stripping gas is then recycled to the stripping tower.

In another embodiment, air is utilized as the stripping media, on a once-through basis and is passed through the stripping tower. This air, containing the ammonia gas from the regeneration solution, is then scrubbed with sulfuric or phosphoric acids. The regeneration solution, which is now substantially ammonia free, is recirculated to the ASD system. The ammonium phosphate or ammonia sulfate produced by the scrubbing of the air can then be used in the manufacture of diammonium phosphate in the case of ammonium phosphate or crystallized to an ammonium sulfate product.

It should be noted that no regeneration solution is discharged into the environment and the air can be circulated within the system so that no air is discharged into the atmosphere. This results in an environmentally clean operation and forms a basis for minimum chemical costs.

The next stage of the process involves the washing of the zeolite. As with the adsorption, first washing, and regeneration stages previously described, the second washing stage is carried out by supplying a washing fluid to one or more fixed feed ports of the ASD whereby zeolites containing residual amounts of entrained material as well as ammonia are cleaned and made ready for another cycle of wastewater purification. Optionally, one or more of the fixed feed ports has no material being delivered therethrough so that the zeolite-filled chamber in fluid communication with the feed port will simply drain.

The number of chambers 14, fixed feed ports 12 and fixed discharge ports 16 in the ASD is a matter of design choice dependent on the types of feed and regeneration materials, the type of adsorbent used, and the size of the ASD. Adsorption chambers filled with 18 to 24 inches of zeolite are effective.

The flow rates of feed materials are likewise a matter of design choice. With the above-described chambers, flow rates of 2–20 gpm/ft$^2$ of ammonium containing wastewater and 2–20 gpm/ft$^2$ of alkaline solution are acceptable. The chambers can be rotated at between 2 and 120 minutes per rotation depending on the exact nature of the process.

The amount of fresh feed materials added to the interaction product streams should be in an amount sufficient to maintain the pH at between 5.0 and 6.0.

The process of the present invention achieves removal of a significant amount of the ammonia from the wastewater. Thus, industrial pond water resulting from the production of ammonium salt compound and containing as much as 600–800 ppm ammonia can be treated by the process of the present invention so as to contain from 2–5 ppm $NH_3$. However, it should be noted that the process is not limited to the treatment of these concentrations of ammonia but rather, is effective at virtually any concentration. Thus, the process can be used for removing ammonia from municipal wastes which might contain 50 ppm ammonia. It also finds application in specific processes wherein the concentration is significantly greater than 800 ppm.

The following examples are given for illustrative purposes only and should in no way be construed as limiting the scope of the process disclosed and claimed.

EXAMPLE 1

The purpose of this test was to determine if industrial wastewater containing 645 ppm of ammonia could be treated to contain between 50 and 100 ppm ammonia, which corresponds to the ammonia content of typical domestic wastewater.

Figure 4:
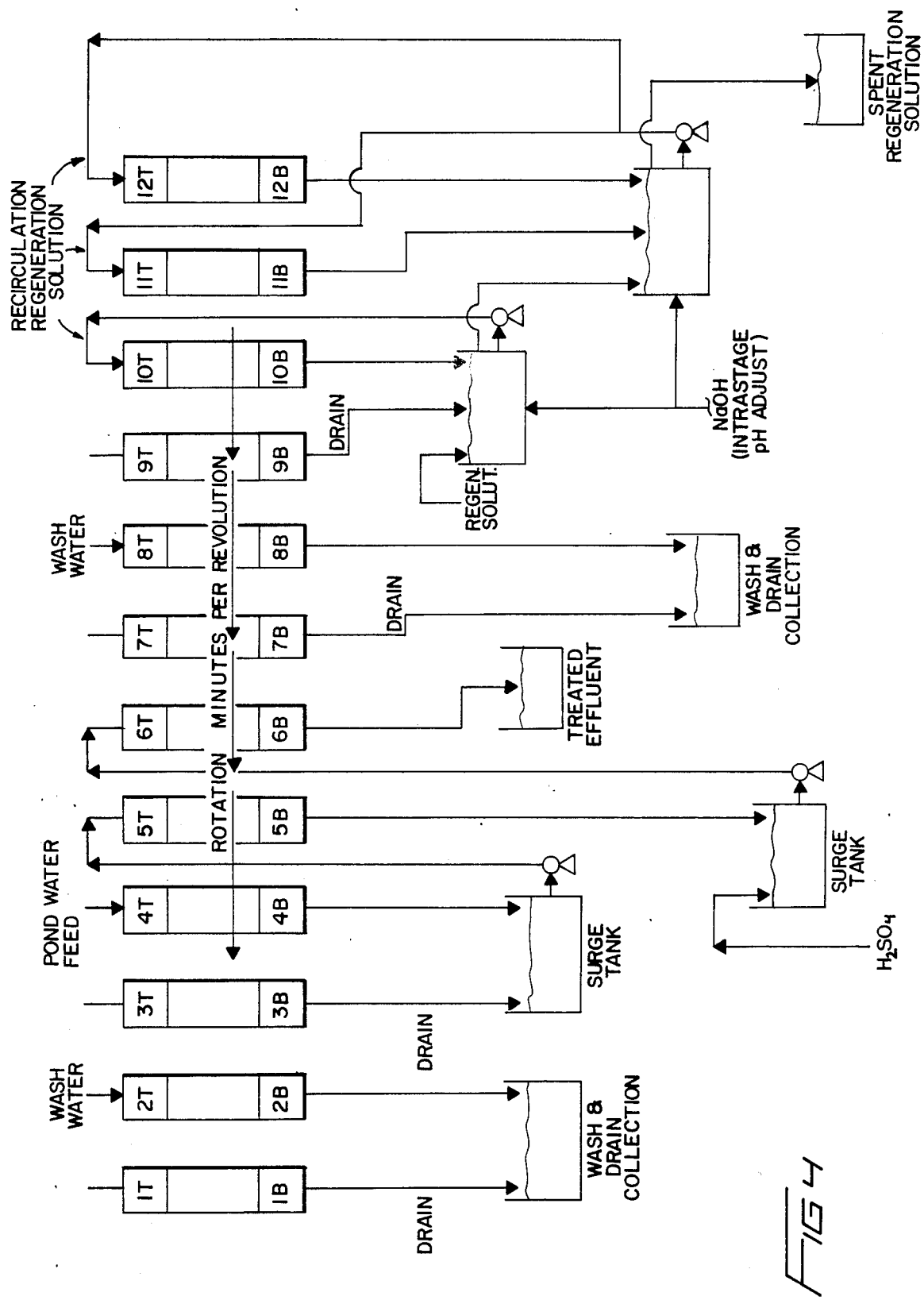

The process of the present invention was carried out using phosphoric chemical plant pond water at a pH of 5.9 containing 645 ppm $NH_3$ and is illustrated in FIG. 4. The ASD itself comprised 12 total fixed feed ports and 14 chambers filled with standard PDZ 150 zeolite. Each chamber was filled with a 16 inch bed of zeolite for a zeolite volume per chamber of 1.3 liters. Each chamber was approximately two inches in diameter. An ammonia-containing pond water was fed into feed port 4T, a first stream of washwater fed into fixed feed port 2T, a regeneration solution containing sodium hydroxide in a solution of sodium sulfate fed into fixed feed port 10T, and a second stream of washwater fed into fixed feed port 8T. The feed rate of pond water was about 6.4 gpm/ft$^2$. The feed rate of the two washwater streams varied but were typically between 2 and 4 gpm/ft$^2$. The regeneration fluid was recirculated from a surge tank at a rate of 5 to 10 gpm/ft$^2$. A small amount of fluid was fed forward. The fresh regeneration solution had a pH between 11 and 11.5 and a sodium sulfate concentration of 10% by weight.

As is evident from FIG. 4, the wastewater/zeolite interaction product being discharged through fixed port 4B contained 182 ppm ammonium solution at a pH of 6.0.

That solution was then fed to fixed port 5T for delivery to another chamber. The second interaction product being discharged from port 5B contained 104 ppm of ammonium ion. Because the removal of ammonium ion from the wastewater causes an increase in the pH, $H_2SO_4$ was added to the product discharged from port 5B to reduce the pH. The pH adjusted solution was then fed to fixed port 6T for final ammonium removal. The product discharged from fixed port 6B contained 72 ppm ammonium at a pH of 6.0.

As with the wastewater absorption stage, there was intra-stage pH adjustment carried out in conjunction with the regeneration stage. More specifically, the interaction product of the alkaline regeneration solution and the ammonium-loaded zeolite was discharged from port 10B where it was fortified in a surge tank with additional alkaline material prior to being fed to fixed ports 11T and 12T. Enough alkaline material was added so as to adjust the pH of the streams entering the ports 10T-12T to a value above 10.5. The concentration of ammonia in the spent regeneration solution was 560 ppm. The solution itself had a pH of 9.4.

The device was rotated at a rate of one rotation per every twenty-four minutes. Although the chambers were filled with 16 inches of zeolite in the present example, it will be appreciated that by increasing the bed depth of the number of zeolite-containing chambers, there will result further reductions in ammonia levels.

COMPARATIVE EXAMPLE

The process of removing ammonia from wastewater using the ASD was carried out without the intra-stage addition of pH adjusting materials in order to demonstrate the benefits accruing therefrom.

The same ASD which was used in Example 1 was used again. This time, however, a municipal wastewater containing 50 ppm ammonia was treated rather than the industrial wastewater treated in Example 1. The process is illustrated in FIG. 5.

The municipal wastewater having a pH of 6.0 was fed into fixed port 2T' at a rate of about 12 gpm/ft². The interaction products discharged from fixed ports 2B', 3B' and 4B' were fed to successive feed ports without intra-stage addition of an acidic material. Likewise, the alkaline regeneration fluids, which comprised a 2N solution of $Na_2SO_4$ and NaOH at an initial pH of 11.5 were added to ports 10T' and 12T' at a rate of 8-10 gpm/ft² without being fortified with additional alkaline material.

In order to assess the ammonia removal process on a differential basis, an excess of washwater was fed into fixed feed port 8T' since such insures a minimization of cross-contamination.

It can be seen that without intra-stage pH adjustment of the countercurrently circulated wastewater, there was an overall increase in the pH as the wastewater containing ammonium passed through the four chambers. Thus, the pH of the effluent being discharged through adsorption stage discharge ports 2B', 3B', 4B' and 5B' was 9.1, 10.1, 10.0 and 10.6 respectively which translates into an overall increase of 1.5.

Because of the pH increase between for example, positions 4 and 5, the formation of unadsorbed ammonia becomes more and more favored over the ammonium ion contained in the wastewater. This phenomenon leads to the release of residual amounts of ammonium left over from the regeneration stage and thus accounts for the observed increase in the ammonia content from 3.6 to 6.7 ppm between stages 4 and 5. Likewise, by not carrying out intra-stage addition of alkaline materials during the regeneration stage, a decrease in pH is observed which makes desorption less efficient since the adsorbed ammonium ion becomes more favored over the unadsorbed ammonia. It will be appreciated that the elimination of the intra-stage addition of alkaline materials during the regeneration stage compounds the effect of eliminating the intra-stage addition of acidic material during the loading stage since increased amounts of residual ammonium will be present on the zeolite during the loading stage.

The example demonstrates that municipal wastewater ammonium levels could be reduced to 2 ppm. The concentration of the regeneration solution increased to 70 ppm.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for the continuous removal of ammonia from wastewater comprising the steps of:
    (a) providing a plurality of zeolite-filled chambers moving about a circular path sequentially in periodic fluid communication with a stationary adsorption stage feed port and a stationary regeneration stage feed port as well as corresponding stationary adsorption stage and regeneration stage discharge ports at an end of said chambers opposite to said respective feed ports;
    (b) adsorbing ammonium ions onto the zeolite by supplying a solution containing ammonium ions to a first stationary feed port, said solution being delivered in sequence to said plurality of zeolite-filled chambers to form an ammonium-loaded zeolite and an interaction product comprising wastewater with substantially reduced amounts of ammonium, said interaction product being discharged through a first adsorption stage discharge port for entry into a second stationary adsorption stage feed port;
    (c) regenerating ammonia from said zeolite filled chambers by supplying an alkaline regeneration fluid to said stationary regeneration stage feed port, said regeneration fluid being delivered in sequence to said plurality of chambers containing said ammonium-loaded zeolite and effecting desorption of a substantial portion of the ammonium ions from said ammonium-loaded zeolite by ion exchange conversion of the ammonium ions to ammonia;
    (d) repeating said steps (b) and (c).

2. The process of claim 1 further comprising a pretreatment step wherein the wastewater pH is adjusted to between about 4 and about 6.

3. The process of claim 1 wherein said interaction product is combined with at least one of acid and additional wastewater to form a second feed solution before entry into said second stationary adsorption stage feed port.

4. The process of claim 3 wherein said acid is $H_2SO_4$.

5. The process of claim 1 further comprising the step of post-treating said first, second, or additional purged adsorption stage interaction products to remove residual amounts of ammonium ions.

6. The process of claim 5 wherein said post-treatment step comprises adding ground zeolite which adsorbs the residual amounts of ammonium ions.

7. The process of claim 1 wherein the alkaline regeneration solution supplied to said stationary regeneration stage feed port and delivered to the chambers containing said ammonium-loaded zeolite of step (c) forms a second interaction product comprising an alkaline/ammonia solution, said second interaction product being discharged through said stationary regeneration stage discharge port for entry into a second stationary regeneration stage feed port.

8. The process of claim 7 wherein said second interaction product is combined with an alkaline material before entry into said second stationary regeneration stage feed port.

9. The process of claim 1 further comprising a stationary washing stage feed port and a corresponding stationary washing stage discharge port in periodic fluid communication with said plurality of zeolite-filled chambers, the ammonium-loaded zeolite from step (b) being washed by supplying a washing fluid to said stationary washing stage feed port for delivery into said chambers, said washing fluid effecting removal of residual amounts of entrained material.

10. The process of claim 9 further comprising a second stationary washing stage feed port and a corresponding second stationary washing stage discharge port in periodic fluid communication with said plurality of zeolite-filled chambers, the zeolite of step (c) being washed by supplying a second washing fluid to said second stationary washing stage feed port for delivery into said chambers containing zeolite with residual amounts of ammonia, said second washing fluid effecting removal of said ammonia so as to provide substantially fresh zeolite.

11. The process of claim 1 wherein said wastewater contains up to 800 ppm ammonia.

12. A process for the continuous removal of ammonia from wastewater comprising the steps of:
  (a) conducting a stream of liquid containing ammonia in a high concentration to a first adsorption-stage feed port;
  (b) conducting a stream of liquid regeneration solutions containing ammonia in a low concentration to a regeneration-stage feed port;
  (c) discharging a stream of liquid containing ammonia in a concentration between said high and low concentrations from a first discharge port;
  (d) countercurrently conducting the liquid of step (c) to a second or additional adsorption-stage feed port;
  (e) discharging a second or additional stream of liquid containing ammonia in a concentration lower than the liquid of step (c) from a second or additional adsorption stage discharge port;
  (f) discharging a stream of liquid containing free ammonia from a regeneration-stage discharge port;
  (g) advancing a plurality of chambers containing zeolite in fluid communication in sequence with said feed ports and said discharge ports; and
  (h) repeating steps (a)–(g).

13. The process of claim 12 wherein said wastewater contains up to 800 ppm ammonia.

* * * * *